Figure 1:
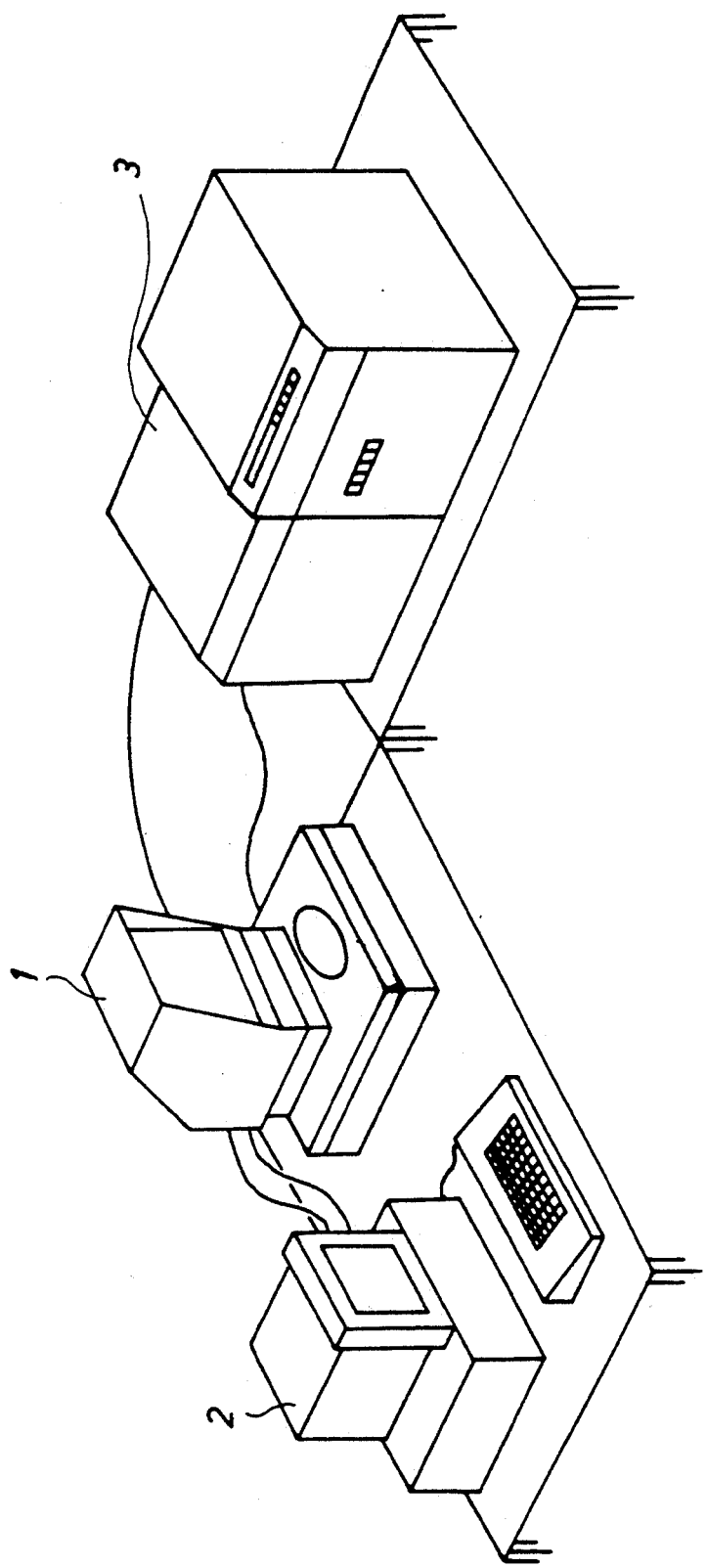

United States Patent [19]
Leonard

[11] Patent Number: 5,271,066
[45] Date of Patent: Dec. 14, 1993

[54] COORDINATE DETERMINING DEVICE

[75] Inventor: Jacques V. Leonard, Antwerp, Belgium

[73] Assignee: Agfa-Gevaert, N.V., Mortsel, Belgium

[21] Appl. No.: 688,441

[22] Filed: Apr. 22, 1991

[30] Foreign Application Priority Data

Apr. 26, 1990 [EP] European Pat. Off. ......... 90201043.8

[51] Int. Cl.$^5$ .................... G06K 9/00; G03B 23/08
[52] U.S. Cl. ........................................ 382/8; 358/487; 353/27 R
[58] Field of Search .............. 340/706, 707, 709; 353/27 A, 27 R; 355/45; 358/452, 453, 487, 102; 382/1, 8, 61, 48; 364/225.5

[56] References Cited

U.S. PATENT DOCUMENTS

| | | | |
|---|---|---|---|
| 3,936,596 | 2/1976 | Inuiya | 358/102 |
| 4,682,242 | 7/1987 | Sugita | 355/45 |
| 4,700,237 | 10/1987 | Yoshioka et al. | 358/102 |
| 4,807,041 | 7/1989 | Kishi et al. | 358/102 |
| 4,875,768 | 10/1989 | Hirasawa et al. | 353/27 A |

Primary Examiner—Michael T. Razavi
Assistant Examiner—David Fox
Attorney, Agent, or Firm—Breiner & Breiner

[57] ABSTRACT

A device for reading of (a) location(s) on an image on a transparent support and an apparatus for scanning and digitizing at least part of said image defined by said location(s) on the transparent support.

5 Claims, 4 Drawing Sheets

COORDINATE DETERMINING DEVICE

DESCRIPTION

1. Field of the invention

The present invention relates to a device for reading of (a) location(s) on an image on a transparent support and to an apparatus for scanning and digitizing at least part of an image defined by said location(s) on a transparent support.

2. Description of the state of the art

Scanning device of the above-named kind essentially comprise a platen for carrying an image to be scanned, a light-source for illuminating said image, means for directing image-wise modulated light onto an opto-electronic sensor such as a CCD sensor and signal digitizing means.

An image to be scanned and digitized does not always occupy the entire area of the image reading surface of the original platform. In many cases, the dimensions of the image are not only smaller than the reading surface but the entire surface of the image is not necessarily read at all times.

There have been needs that make it necessary to have only a pertinent region of a given image read out, or only have a pertinent region of an image subjected to image processing or have it rotated at a certain angle. For example, many conventional scanning and digitizing apparatus are only equiped to provide an electrical representation of the entire image on the platen and to store this signal in a memory means. Signals representing unnecessary portions of the image are then acquired and stored. This ineffective action enhances the scanning time and requires an unreasonably large memory capacity with a consequent increase in the cost of the apparatus.

Hence, before scanning the operator might wish to have the possibility of specifying which part of an image is to be digitized and he might wish to have the opportunity to specify that an original is to be rotated by a certain angle before being scanned.

This action of selecting and defining only a part of an image to be digitized arid/or of rotating a portion of an image at a certain angle before scanning and digitizing is called in the art "cropping".

Prior art systems exist by means of which cropping can be performed either on the scanning system itself or on a separate device. By using a separate device a lot of time can be saved and the productivity of the scanner can be enhanced a lot since the operator can perform the preparatory work of a certain job while the scanner is scanning another job of a badge.

A first prior art method is a method that is performed on the scanner itself. According to this prior art method a low resolution high speed pre-scan is performed. The scanned image is displayed on a monitor and cropping is performed on the basis of the displayed image. This method is highly time-consuming since it requires an additional cycle on the scanner itself. While the scanner is performing the pre-scan it is not free for another job.

A second method can be performed on a separate device. The device comprises a digitizing tablet onto which an image to be scanned is positioned. Marks are provided on the image delimitating the area to be scanned and digitized. By means of the digitizing tablet and pencil connected to the system coordinates of the marks are communicated to the scanner.

A third system comprises a video camera a monitor and an electronic "mouse". An image is recorded by means of the video camera and displayed on the monitor. By using the electronic mouse an area to be scanned and digitized is defined. The system is not very accurate since optical deformations are induced by the display system.

A fourth prior art system is mainly used in connection with drum scanners. An image is attached to a rotating, transparent drum either the scanning drum or a separate drum.

A wagon comprising a lens and a light source are transported past the image, thereby projecting part of the image into a magnifying glass or sometimes onto a screen. Through the magnifying glass the image is inspected and coordinates of points deliminating an area to be scanned and digitized are fed into the scanning system either manually (via keyboard) or automatically (via electronic mouse). This system is time-consuming and, due to the use of the magnifying glass very inconvenient.

OBJECT OF THE INVENTION

It is an object of the present invention to provide a device for reading a location on an image on a transparent support that does not have the drawbacks of the prior art methods and devices.

It is another object of the invention to provide device for determining on an image on a transparent support a pertinent portion that is to be scanned and digitized and/or for determining a rotation angle of the image relative to a scanning direction and for controlling the scanning operation in correspondence with said information.

Further objects will become apparent from the description hereinbelow.

SUMMARY OF THE INVENTION

To achieve the above objects the present invention provides a device for reading of at least one location on an image on a transparent support comprising a platen on which the image is positioned,
a light-source for illuminating said image or at least part thereof,
means for moving said image on said supporting table,
optical means adapted to direct image-wise modulated light towards a display screen provided with a reference mark,
coordinate detecting means for reading out coordinates of said location on said image when said location on the displayed image coincides with said reference mark on the screen, and
means for communicating said coordinates to a data-processing device.

In a preferred embodiment the optical means are selected so as to enable display of the image or at least part thereof in an enlarged form. Display in enlarged form has the advantage that by shifting the original on the platen an envisioned location on the image can be positioned very accurately so that it coincides with the reference means on the screen.

The reference means in a specific embodiment have the form of a set of two intersecting orthogonal axes provided on the screen or optically projected on the screen. The location that is to be read is then positioned by moving the image on the platen, so that it coincides with the intersection of the axes.

To determine the coordinates of a location that coincides with the reference mark on the screen the image is preferably placed in a holder that is provided with at least two reference pins. The holder can be in the form of a ring or a rectangle into which a transparent support bearing an image can be tightened. A frame comprising at least one cut-out into which holders as hereinbefore described can be placed can then be positioned on top of the supporting platen of the coordinate reading device. Alternatively, the holder can be used without the frame. For the purpose of reading the coordinates of a certain location, the frame or the holder in case no frame is used, are shifted until the display of the envisioned location coincides with the intersection of the orthogonal axes on the screen of the coordinate reading device.

The coordinates of a certain location are determined relative to a reference point by means of two orthogonal incremental position detecting means provided on the image supporting table of the coordinate reading device. Suitable electronics decode the measured information.

The invention further comprises an apparatus for scanning and digitizing at least part of an image on a transparent support comprising a work support for supporting said image, means for illuminating at least part of said image, a drive mechanism for displacing said illuminating means and said support relative to each other, means for directing image-wise modulated light to an opto-electronic sensor for converting the image-wise modulated light into an electric signal and means for digitizing said electrical signal characterised in that it further comprises a reading device according to the present invention and means for controlling the scanning operation taking into account the coordinates communicated by said reading device.

A holder and a frame as used in the coordinate detecting system can likewise be used on the scanner. The frame is then placed on the glass platen of the scanner, the frame comprises reference pins that cooperate with provisions on the glass platen to define a reference point for the coordinate determination.

The scanning operation is then controlled by means of the information concerning the area to be scanned that is communicated to the scanning system. This information concerns coordinates of points defining the area to be scanned or concerning the angle of rotation of the image. The angle of rotation can be determined mechanically by means of the angular position of the holder. The reference or origin relative to which these coordinates are to be interpreted is then defined by means of the reference pins in the holder and the position of the holder in frame on the support of the scanner.

The use of a holder for holding images on transparent supports is advantageous because the images can be held in a flat position required for scanning and contact between the original and the glass-plate of the scanner is prevented so that Newton rings are avoided without the need to use for example Newton glass, Rutherford powder etc.

EMBODIMENTS

Figure 3:
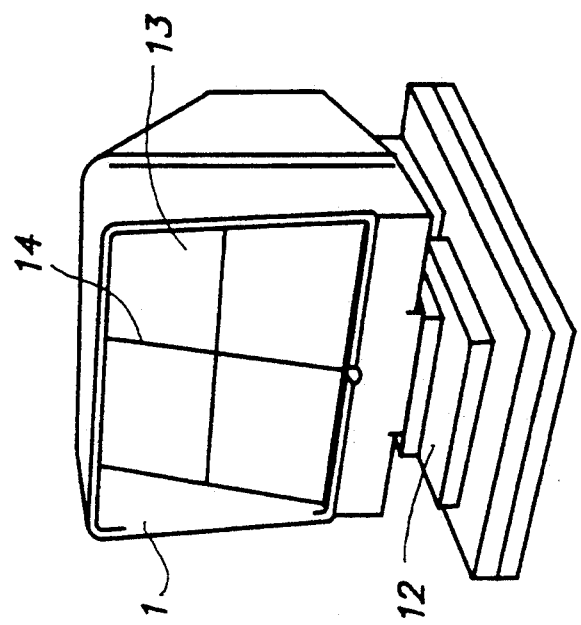
Figure 2:
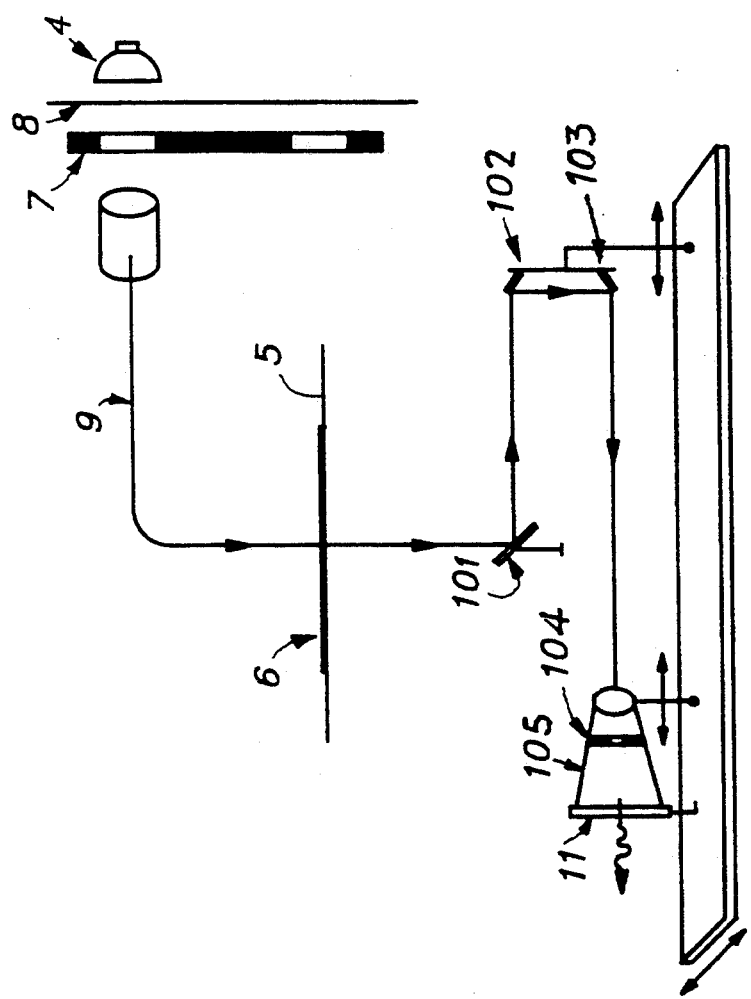
Figure 4:
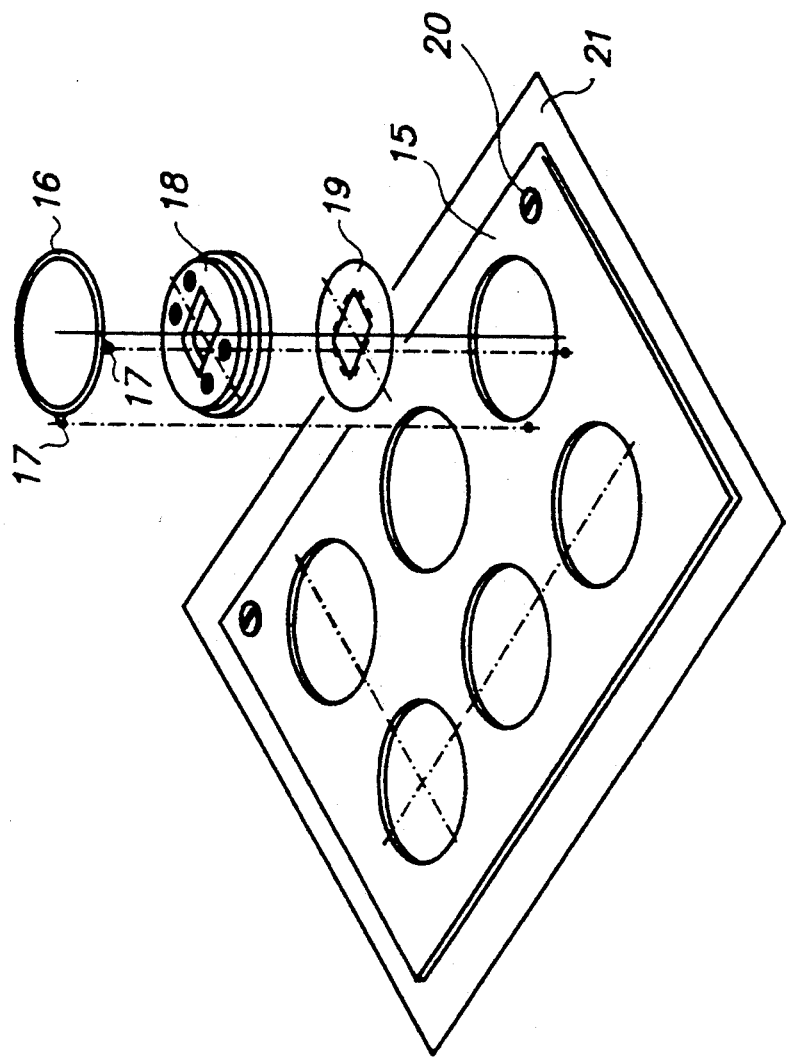
Figure 5:
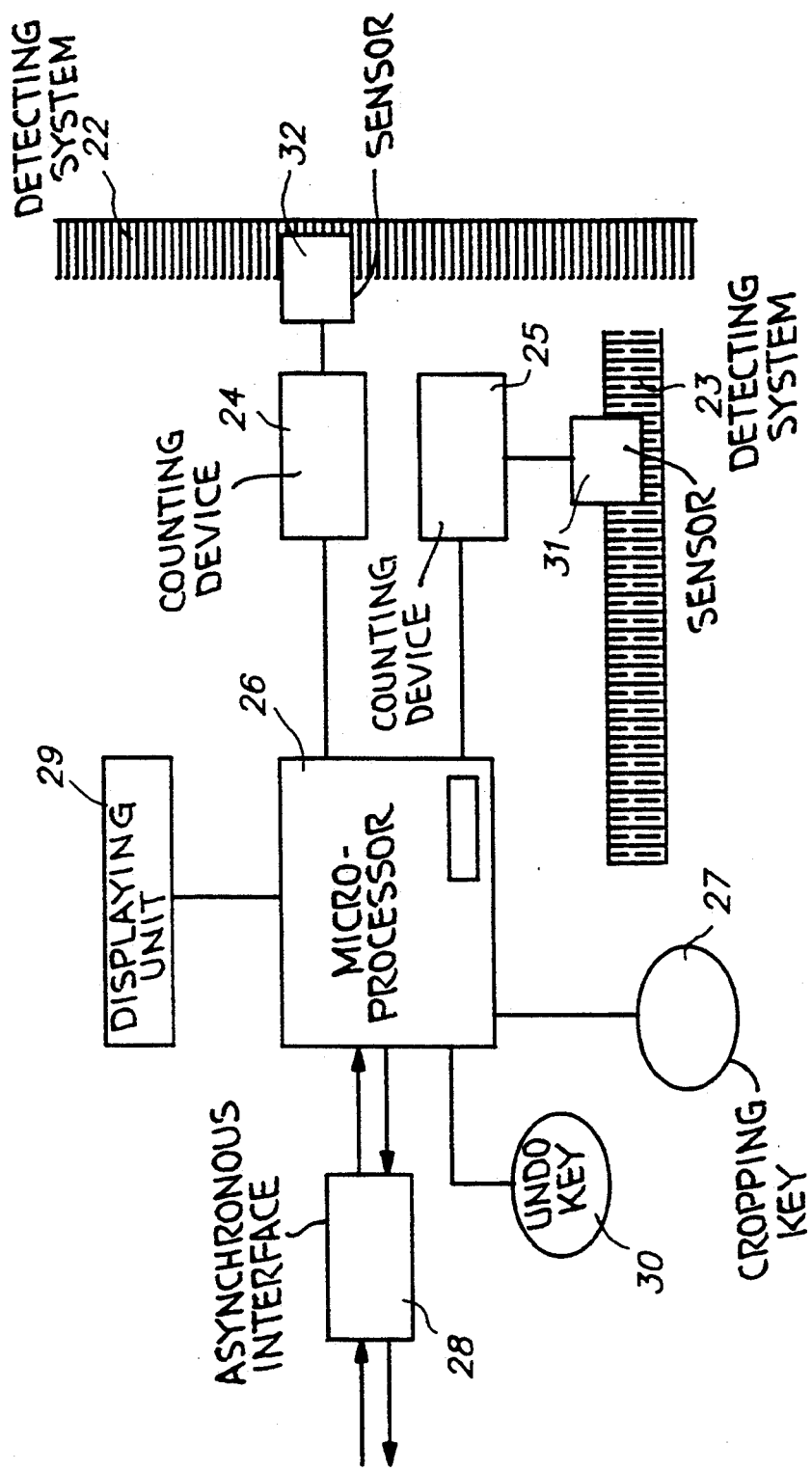

Specific embodiments of the invention will be described hereinbelow with reference to the accompanying drawings in which FIG. 1 is a general representation of a scanning and digitizing device incorporating a reading device according to the present invention, FIG. 2 schematically shows a scanning and digitizing device, FIG. 3 shows a reading device according to the present invention, FIG. 4 shows a frame comprising at least one holder for images on transparent supports, FIG. 5 is a block diagram of an embodiment of a coordinate detecting means for reading out coordinates of a location on said image.

The scanning and digitizing apparatus of FIG. 1 comprises three main subparts: a viewer 1, a microprocessor 2 and a scanner 3. The devices are interconnected via suitable electronic interfaces.

FIG. 2 shows a colour scanner comprising a light source 4 for projecting scanning light towards an image plane and a work support 5 for supporting an image-bearing sheet 6 (in this particular application this is a transparent image-supporting sheet) in said image plane. Said light source 4 and said support 5 are relatively displaced by means of a suitable drive mechanisms that is not shown in this figure. A filterwheel 7 is provided for separating white light emitted by the light source 4 into colour components and transmission fibres 9 are provided for directing scanning radiation to the image plane. An infra-red filter 8 is provided in between the light-source and the filterwheel. The scanner further comprises suitable optics 101 to 105 for directing image-wise modulated light to an opto-electronic sensor 11, for example a CCD sensor and means for converting the image-wise radiation into a digitized signal (not shown on the figure).

The operation of the scanner is micro-processor controlled for example via a personal computer 2 connected thereto. The personal computer receives information from a coordinate reading device 1.

The coordinate reading device 1 is comparable with a viewer of the kind that is used for reading micrographics. A such-like reading device, as shown in FIG. 3, comprises a table 12 onto which an image on a transparent support is placed, a light-source to illuminate the image, optics to capture, direct and enlarge the image-wise modulated (i.e. transmitted) light (not shown in the figure). The image-wise transmitted light is directed onto a conveniently located screen 13.

In an embodiment according to the present invention an arrangment of intersecting orthogonal axes 14 is provided on the screen.

On the image supporting table a frame 15 can be placed wherein at least one image holder can be inserted.

A frame for 6 holders is shown in FIG. 4. A holder can for example be in the form of a circular reference ring 16 provided with reference pins 17 that is placed on a rotatable ring 18 provided with teeth (for fixing a rotational angle) that fit into the frame and a clamp platen 19. The transparent support bearing the image is clamped between the rotatable ring 18 and the clamp platen 19. The frame comprises reference pins 20 that can cooperate with provisions in the image supporting glass platen 21 of the scanner.

On the coordinate detecting device the frame or the holder can be shifted in two orthogonal X and Y directions and that can also be rotated by a certain angle relative to these directions. By means of the reference pins a reference position can be determined. By shifting the holder comprising the image on the supporting table an envisioned point on the image can be very accurately positioned so that its display on the screen coincides with the intersection of the axes that are provided on the screen.

As shown in FIG. 5, the coordinates of a certain position are determined by means of 2 orthogonal incremental position detecting systems 22 and 23 provided on the sides of the supporting platen of the coordinate reading device and 2 sensors 31 and 32. Suitable electronics shown in FIG. 5 decode the measured information, process the information and transmit it to the controlling microprocessor.

FIG. 5 shows a first sensor 22 detecting the movement in X-direction, the second 23 detecting the movement in the Y-direction. Each of the sensors is connected to a counting device 24 and 25. The counting devices feed their information to the microprocessor system 26. By means of a cropping command via cropping key 27 coordinates can be fed into the scanner via an asynchronous interface 28. The scanner operation is controlled via this asynchronous interface (for example a RS 232 or RS 422 standard interface). The microprocessor system may be provided with a display unit 29 displaying the position of the original or the length and the width of the area to be scanned and with an UNDO key 30 to correct data or to reset the system.

On the coordinate detecting device the image is clamped in a suitable holder that can be placed in a frame. The supporting platen of the scanner is adapted for cooperation with such a frame, namely on its document supporting platen at least one cut-out is provided wherein reference pins provided on the frame can be entered so as to fix the relative position of the frame find the holders relative to the scanner. In this way coordinates that are determined by the coordinate reading device and by means of which the operation of the scanner is controlled, can be interpreted in an unequivocale way.

I claim:

1. An apparatus for reading at least part of an image on a transparent support comprising a coordinate determining section for determining coordinates of a location on said image comprising;
   a support table on which said image is positioned,
   a light source for illuminating at least part of said image,
   optical means adapted to direct image-wise modulated light towards a display screen provided with a reference mark,
   means for moving said image on said support table until the display of the image at said location coincides with said reference mark,
   means for determining the coordinates of said location, and,
   means for communicating said coordinates to a scanning and digitizing section,
said scanning and digitizing section comprising;
   a work support for supporting said image,
   means for illuminating at least part of said image,
   a drive mechanism for displacing said illuminating means and said work support relative to each other,
   an opto-electronic sensor for converting the image-wise modulated light into an electric signal,
   means for directing image-wise modulated light to said opto-electronic sensor,
   means for digitizing said electric signal, and
   means for restricting the operation of the scanning and digitizing section to an area delimited by locations corresponding to the coordinates communicated from said coordinate determining section.

2. An apparatus according to claim 1 wherein said scanning and digitizing section is provided with a frame having at least one cut-out for carrying a holder wherein said image is fixed, provided with reference pins for cooperating with provisions on said work support for determining a reference position relative to which determined coordinates are defined.

3. An apparatus according to claim 1 wherein said coordinate determining section further comprises means for rotating said image relative to a scanning direction.

4. An apparatus according to claim 1 wherein said optical means are adapted to display said image in an enlarged form.

5. An apparatus according to claim 1 wherein the support table of the coordinate determining section carries a frame with at least one cut-out for carrying a holder for said image, the holder and the cut-out being provided with cooperating means for defining a reference position relative to which said coordinates are determined.

* * * * *